United States Patent [19]
Lattin

[11] 3,731,100
[45] May 1, 1973

[54] MONITOR OF THE CONCENTRATION OF RADIOACTIVE IODINE IN A STREAM OF GAS

[75] Inventor: Kenneth R. Lattin, Richland, Wash.

[73] Assignee: The United States of America as represented by the United States Atomic Energy Commission

[22] Filed: Apr. 7, 1971

[21] Appl. No.: 131,970

[52] U.S. Cl. .250/83.6 FT, 250/43.5 MR, 250/106 T
[51] Int. Cl. ................................................G01t 7/04
[58] Field of Search ...............250/43.5 MR, 83.6 FT, 250/43.5 FC, 106 T

[56] References Cited

UNITED STATES PATENTS 3,226,197   12/1965   Lewis .......................250/43.5 MR X
3,246,151   4/1966   Tanaka et al. .............250/43.5 MR X
3,555,278   1/1971   Schroeder......................250/83.6 FT
3,614,421   10/1971   Alter et al. .................250/83.6 FT X Primary Examiner—Archie R. Borchelt
Attorney—Roland A. Anderson

[57] ABSTRACT

The concentration of a radioactive substance in the effluent from a nuclear reactor is measured by counting total radiation in the effluent, filtering out the particular radioactive substance, counting total radiation in the filtered effluent, and combining the results. This method is particularly sensitive to rapid changes in the concentration, and is especially adapted to the monitoring of amounts of radioactive iodine.

4 Claims, 4 Drawing Figures

Patented May 1, 1973 3,731,100

Inventor
Kenneth R. Lattin
Attorney 3,731,100

MONITOR OF THE CONCENTRATION OF RADIOACTIVE IODINE IN A STREAM OF GAS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The operation of a nuclear reactor results in the creation of various radioactive elements. An important requirement of safe operation is proper control of these elements. Such control is normally accomplished by first filtering the effluent cooling air to remove particulate materials. This leaves iodine and noble gases, since other gases occur in negligible quantities. The measurement of the radioactivity of these gases is important as a safeguard to public health. The measurement of the radioactivity of the iodine present is particularly important because it is concentrated in animal thyroids.

For this reason, an adsorbent filter of a material such as activated charcoal is normally placed in the effluent stream to remove a high percentage of the radioactive iodine. The filtered effluent is then monitored as an assurance of proper reactor operation and as a detector of such operating difficulties as rupture of a fuel rod.

Past monitoring efforts have used an adsorbent filter placed in a stream sampled from the effluent, with a detector placed to respond to the radiation count from the trapped iodine. There were several disadvantages to this method. First, high release rates might have saturated a detector. Second, a high release rate followed by a low release rate caused inaccurate readings as the radioactivity associated with the later, slower release was masked by the decay from the larger quantity released earlier. A final disadvantage was the presence of radioactive noble gases in concentrations much higher than those of the iodine, which tended to mask or distort the iodine reading.

One object of the present invention is to provide a device for monitoring radioactivity in a fluid stream which reduces the effects of saturation in the detector used.

Another object of this invention is to provide a device for monitoring radioactivity in a fluid stream which improves the time rate of response to changes in the concentration of an adsorbable substance such as radioactive iodine.

Another object of this invention is to provide a device for monitoring radioactivity in a fluid stream which increases the accuracy of the monitoring of low levels of adsorbable fluids in the presence of higher concentrations of filterable fluids such as radioactive noble gases.

SUMMARY OF THE INVENTION

The present invention is a monitor of radioactivity in a fluid stream. In practicing the invention the total amount of radioactivity is monitored, adsorbable materials are removed by a filter, and the filtrate is then monitored for radioactivity. The difference or the ratio of the two signals provide a measure of the radioactivity of the adsorbed material. The device described is particularly useful for monitoring radioactive iodine, which is readily adsorbed on activated charcoal and other filter materials.

BRIEF DESCRIPTION OF THE DRAWINGS

The accompanying drawings will facilitate understanding of this invention.

DETAILED DESCRIPTION OF THE INVENTION

Figure 1:
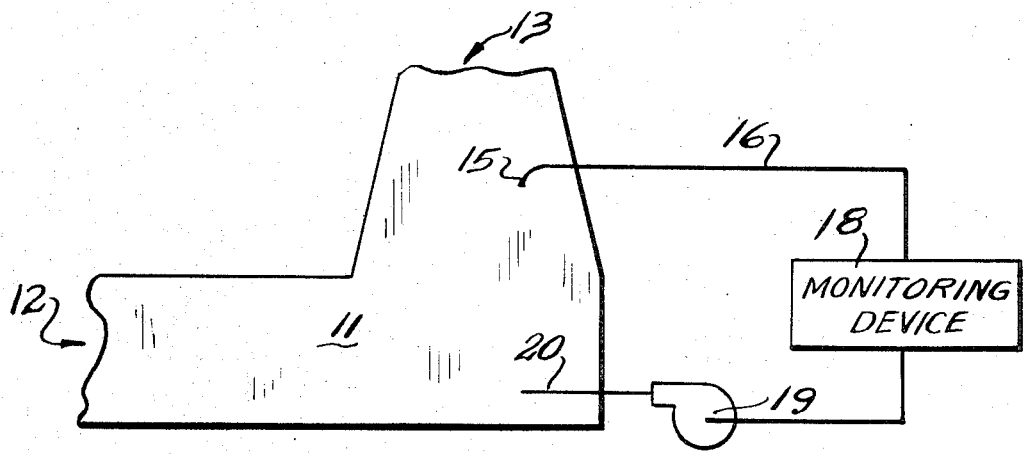
FIG. 1 is a block diagram showing the invention in place in a sampling line.

FIG. 1 shows a cutaway of a portion of stack 11 which carries effluent from a nuclear reactor, the effluent entering at 12 and flowing through to 13 on its way to exhaust to the atmosphere. A sampling probe 15 is placed in the stream to obtain a representative sample of effluent. This sample is conveyed by pipe 16 to the monitoring device 18 and passes through blower 19 before being returned to the stack at exhaust 20. Exhaust 20 is shown on the upstream side of the sampling probe 15. It could equally as well be placed on the downstream side.

Figure 2:
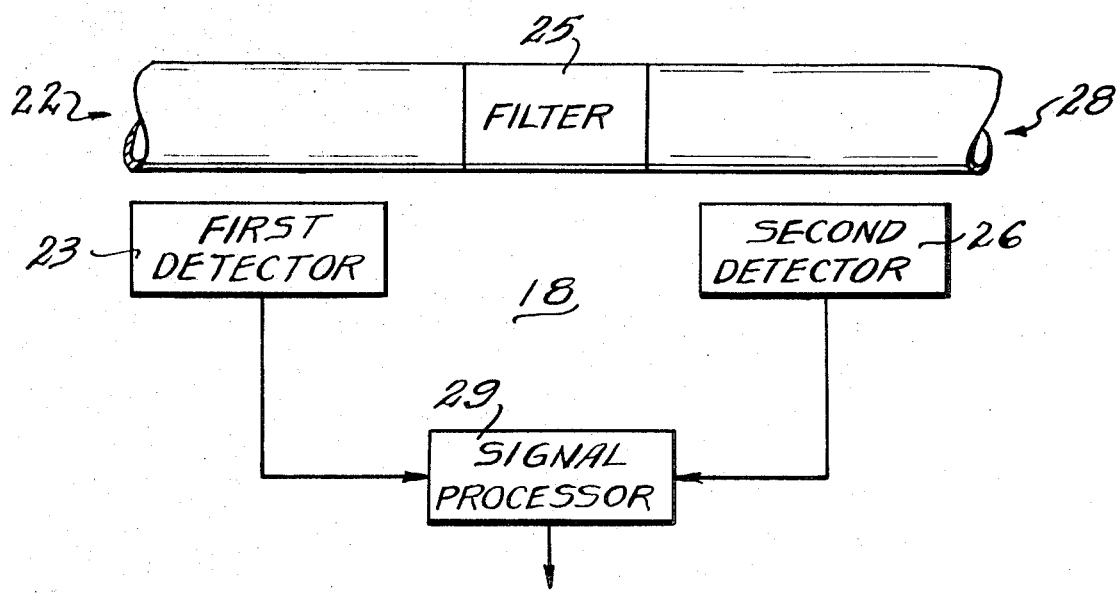
FIG. 2 is an expanded block diagram showing the placement of components of the invention.

FIG. 2 is an expanded drawing of monitoring device 18. Sampled gases enter at 22 and their radioactivity is detected by first detector 23. The stream continues through filter 25 and then its radioactivity actuates second detector 26. The stream leaves the monitor 18 at 28 on its way to be returned to stack 11 at exhaust 20. The counts of radioactivity obtained by first detector 23 and second detector 26 are combined in signal processor 29.

Figure 3:
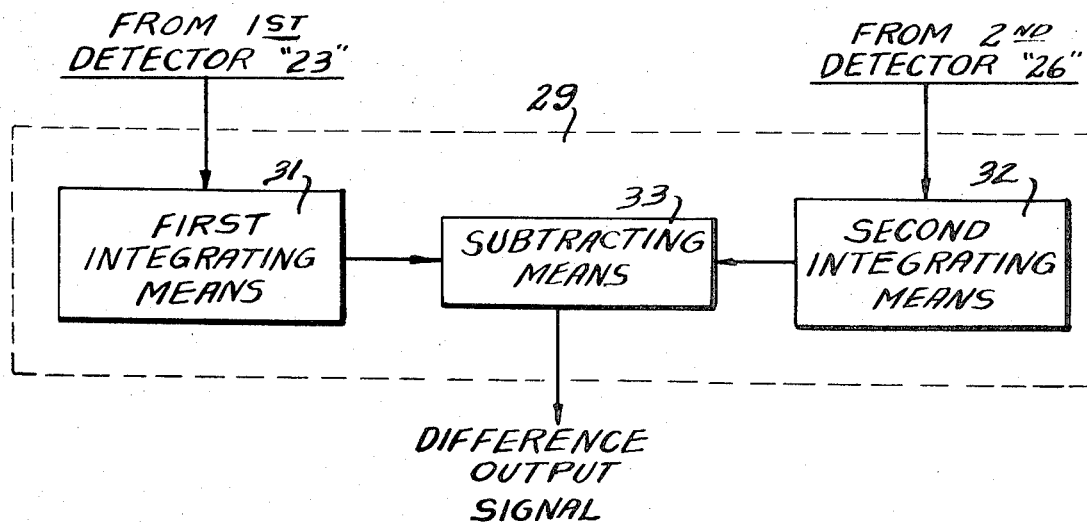
FIG. 3 is a block diagram showing one embodiment of a signal processor.

FIG. 3 is a block diagram comprising an expanded drawing of signal processor 29. A signal from first detector 23 is integrated in first integrating means 31, and a signal from second detector 26 is integrated in second integrating means 32. The outputs of these two integrating means are combined in subtracting means 33, producing a difference output signal.

Figure 4:
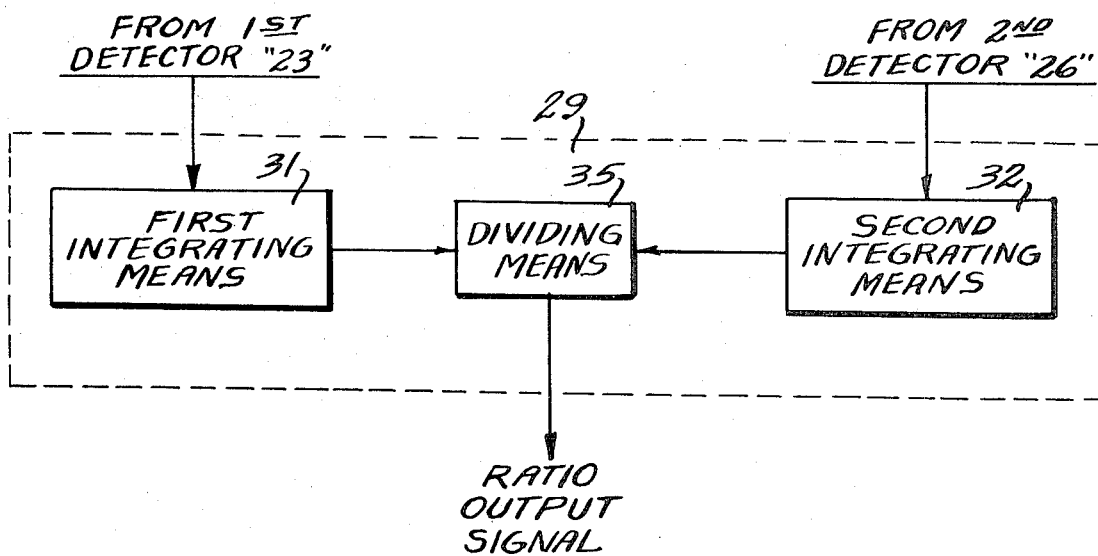
FIG. 4 is a block diagram showing an alternate embodiment of a signal processor.

FIG. 4 is an alternate embodiment of signal processor 29. The signal from first detector 23 is integrated in first integrating means 31, and the signal from second detector 26 is integrated in second integrating means 32. The outputs of these two integrating means are divided in dividing means 35 to produce a ratio output signal, the ratio of the detected signals.

Radioactive iodine has been the subject of much concern as an effluent from nuclear reactors. It is one of the products of nuclear fission that occurs with a relatively high probability, it is gaseous in a range of temperatures to be expected in nuclear reactors, and it is concentrated in animal thyroid glands. Other dangerous fission products such as $^{90}Sr$ are particulate and can be removed by mechanical filters, while most other gaseous radioactive fission products occur in negligible concentration. It is thus of importance that a major effort be made to monitor the concentration of radioactive iodine in the interest of radiation safety.

The present invention minimizes the problem of saturation of a detector placed so as to be responsive to radiation from trapped radioactive iodine. Typical counters are effective over 4 or 5 decades, a range that may well be exceeded in normal reactor operation. The present invention, responding as it does to counts first of the combination of noble gases plus iodine, then of the noble gases alone, can be expected to have a higher minimum count. For this reason its operation over the same 4 or 5 decades results in an increased sensitivity to variations in the iodine level.

Another advantage of the present invention is its rapid response to changes in the level of radioactive iodine, in comparison with methods involving measuring the radioactivity of trapped iodine. The isotope of primary concern, $^{131}$I, has a half-life of 8 days. This means that a period of relatively heavy escape of $^{131}$I is followed in the conventional detector by a period during which it is difficult to separate new emissions from old. The continuing decay of old adsorbed radioactive iodine constitutes a noise count which masks a new rise, delaying an alert when it is most needed. The present invention obviates this difficulty by operating only upon current rather than stored effluent. The effluent trapped in the past remains in the filter and does not appear as noise to mask changes in the count of radioactivity.

A third advantage is that of minimizing the masking effect of the detected counts from radioactive isotopes of noble gases, counts that typically exceed by several decades those from iodine. These masking counts can also defer detection of a rise in the concentration of radioactive iodine in a conventional detector. In the present invention this masking effect is reduced by signal processing of the two detected signals.

The signal process has been described in general terms because it is possible to use the information in a number of ways. For example, the signal processor may obtain the difference of the counts of the two detectors by subtraction. Such a result, relying also on some electronic integration in the detectors or the processor or both, provides a result proportional to the short-time-average concentration of radioactive iodine. Such a result may be integrated, displayed, or used in other ways to facilitate reactor control and monitoring for reactor safety.

Another possible mode of operation is that of taking a ratio of the detected signals before or after they have been integrated. Such a ratio is a function of the concentration of radioactive iodine and can be used in similar ways to provide control and safety.

I claim:

1. An apparatus for monitoring the concentration of radioactive iodine in the filtered effluent air stream from a nuclear reactor, which stream comprises in addition a quantity of filterable radioactive noble gases, said apparatus comprising:

means for obtaining a sample stream from said effluent stream;

first detecting means positioned to detect radioactivity in said sample stream and producing an electrical output in response thereto;

adsorbent filtering means to remove radioactive iodine from said sample stream, said filtering means disposed in said sample stream downstream from said first detecting means a distance sufficient that radioactive material trapped on said adsorbent filtering means produces no response in said first detecting means;

second detecting means positioned to detect radioactivity in said sample stream a distance downstream from said adsorbent filtering means sufficiently far that radioactivity of materials trapped in said adsorbent filtering means is not detected in said second detecting means, said second detecting means producing an electrical output in response to radioactivity in said filtered sample stream;

first integrating means connected to said first detecting means and responsive to the output thereof to produce a first integrated electrical signal that is a measure of radioactivity in said sample stream before filtering;

second integrating means connected to said second detecting means and responsive to the output thereof to produce a second integrated electrical signal that is a measure of radioactivity in said sample stream after filtering; and signal-processing means connected to said first and second integrating means and responsive to said first and second integrated electrical signals to produce a processed signal that is a measure of the radioactive iodine in said filtered effluent air stream.

2. The apparatus of claim 1 wherein said signal-processing means comprise electrical subtraction means for providing an output that is the difference of said first and second integrated electrical signals.

3. The apparatus of claim 1 wherein said signal-processing means comprise electrical dividing means for providing an output that is the quotient of said first and second integrated electrical signals.

4. A method of monitoring the concentration of radioactive iodine in the filtered effluent air stream from a nuclear reactor, which air stream comprises in addition a quantity of radioactive noble gases, said method comprising the following steps:

sampling said effluent air stream;

measuring radioactivity in the sample obtained thereby;

filtering said sample with an adsorbent filter to remove radioactive iodine from said sample to leave a filtered sample;

measuring radioactivity in the filtered sample;

integrating the measures of radioactivity in said sample and in said filtered sample;

comparing said integrated measures to obtain a measure of radioactive material removed by said step of filtering, which measure is an indication of the concentration of radioactive iodine in said effluent air stream.

* * * * *